Dec. 27, 1955   L. M. KURTZ   2,728,199
SECONDARY SYSTEM FOR FRESH FOOD DOOR COMPARTMENT
Filed Aug. 5, 1952
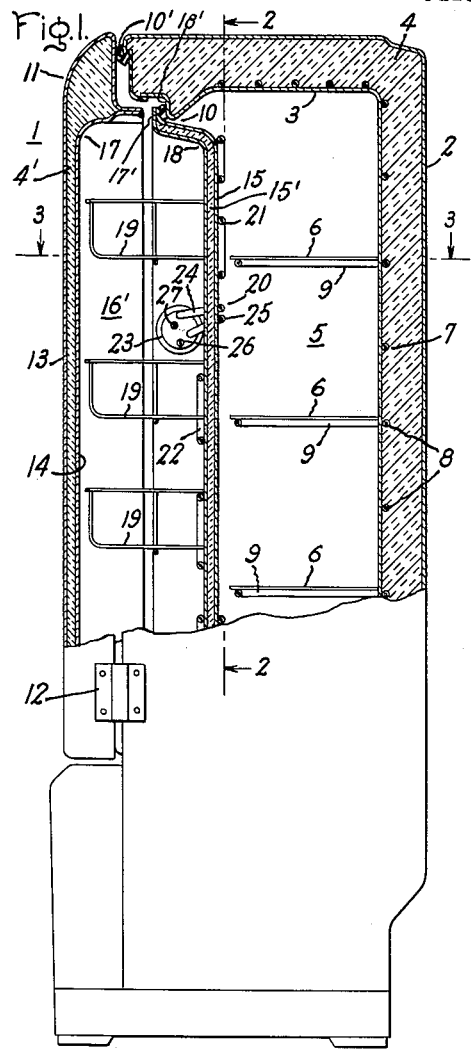
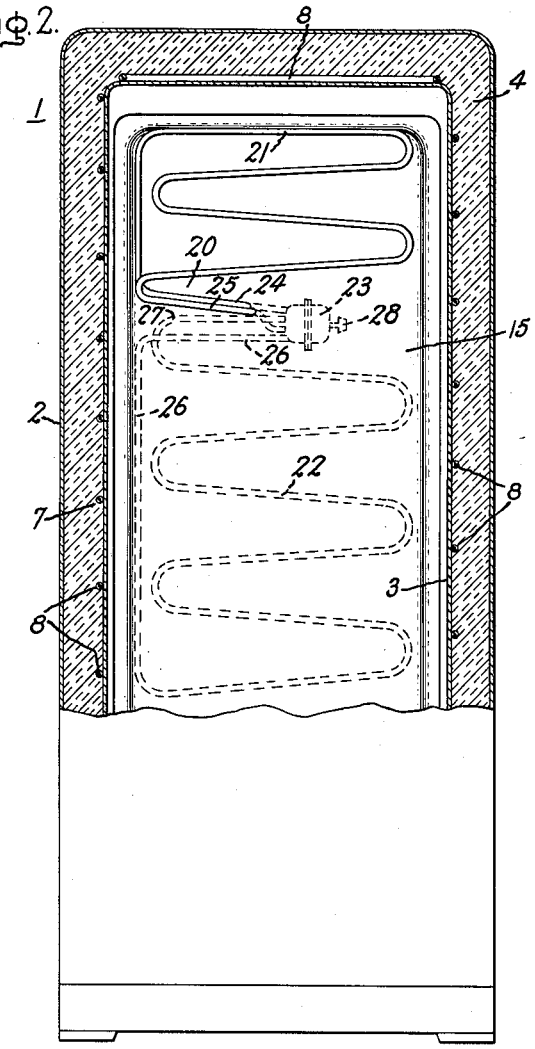
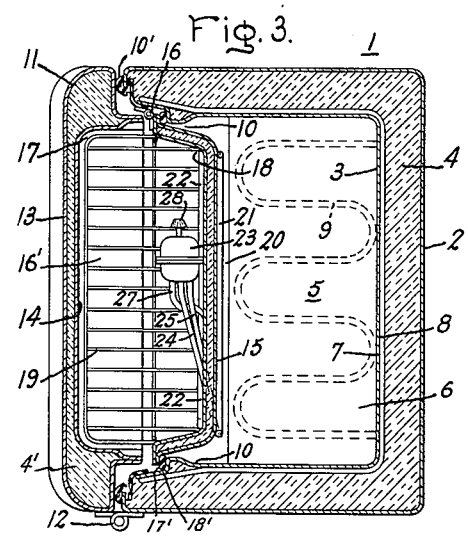
Inventor:
Lowell M. Kurtz,
by *Sheridan Ross*
His Attorney.

United States Patent Office 2,728,199
Patented Dec. 27, 1955

2,728,199

SECONDARY SYSTEM FOR FRESH FOOD DOOR COMPARTMENT

Lowell M. Kurtz, Erie, Pa., assignor to General Electric Company, a corporation of New York Application August 5, 1952, Serial No. 302,697

7 Claims. (Cl. 62—6)

My invention relates generally to refrigeration apparatus and pertains more particularly to home freezers constructed to include fresh food compartments.

While home freezers are primarily employed for storing foods in a frozen state for an extended period of time, it is desirable to include in some home freezers a fresh food compartment wherein may be stored those foods which are soon to be consumed or those foods which are adversely affected in freezing temperatures. Accordingly, the primary object of my invention is to provide an improved home freezer including a fresh food compartment.

Another object of my invention is to provide in a home freezer including a fresh food compartment an improved arrangement whereby the temperature in the fresh food compartment may be controlled independently of the temperature in the freezing compartment.

Still another object of my invention is to provide with a fresh food compartment in a home freezer improved means for cooling the fresh food compartment whereby a variety of temperatures may be maintained therein for providing suitable temperatures for food items requiring different degrees of refrigeration.

Further objects and advantages of my invention will become apparent as the following description proceeds and the features of novelty which characterize my invention will be pointed out with particularity in the claims annexed to and forming part of this specification.

In carrying out the objects of my invention, I provide a refrigerating apparatus comprising a cabinet and an access opening to the cabinet. The access opening is closed by a door and a member divides the cabinet into a fresh food compartment and a freezing compartment. This member cooperates with the door to form the fresh food compartment therebetween. Means are provided for cooling the freezing compartment. A secondary refrigerating system includes a condenser portion and an evaporator portion with the condenser portion being mounted on the upper portion of the member and disposed in the freezing compartment in heat exchange relationship with the air in the freezing compartment. The evaporator portion is mounted on the lower portion of the member and disposed in the fresh food compartment in heat exchange relationship with the air in the fresh food compartment and cools only the lower portion of the fresh food compartment. The upper portion of the fresh food compartment is cooled by heat leakage through the member to the freezing compartment and operates at a temperature higher than that in the lower portion of the fresh food compartment.

For a better understanding of my invention, reference may be had to the accompanying drawing in which Fig. 1 is a partially sectionalized elevation view of a freezer incorporating my invention; Fig. 2 is a section taken along the lines 2—2 in Fig. 1 and looking in the direction of the arrows; and Fig. 3 is a section taken along the lines 3—3 in Fig. 1 and looking in the direction of the arrows.

Referring to Fig. 1, I have shown an upright freezer cabinet generally designated 1. The cabinet 1 comprises an outer wall or case 2 and a spaced inner wall or liner 3. Filling the space between the outer case 2 and the liner 3 is heat-insulating material indicated by 4 and of a type commonly employed for insulating freezer cabinets.

Defined by the liner 3 is the freezing compartment 5 which is provided with a plurality of shelves 6. The freezing compartment 5 is maintained at a satisfactory freezing temperature by a primary refrigerating system (not shown) which includes an evaporator, generally designated 7. The evaporator 7 includes tubing passes 8 which are secured in heat exchange relationship to the outer sides of the top, rear and side walls of the liner 3. The evaporator 7 may also include passes 9 which extend into the freezer compartment 5 and are secured in heat exchange relationship to the under sides of the shelves 6. It will be seen that while the evaporator 7 has been shown as including both the passes 8 on the outside of the liner 3 and the passes 9 on the underside of the shelves 6, the evaporator 7 could comprise solely either the passes 8 or the passes 9 or combinations of parts of both. The space between the outer case 2 and the liner 3 is suitably sealed for thereby minimizing frost formation on the passes 8 and the outer side of the liner which, if permitted to form, could both adversely affect the insulation 4 and cause cabinet corrosion.

Access to the freezing compartment 5 is had through an access opening 10. Provided for closing the access opening 10 is a main door 11 which hangs by hinges 12, only one of which is shown, secured to the outer case 2. A gasket 10' mounted on the cabinet around the access opening 10 effectively seals the cabinet when the door is closed and engaged therewith. As best seen in Figs. 1 and 3, the main door 11 comprises spaced-apart outer and inner doors 13 and 14, respectively. Insulating material 4' is employed between the outer and inner doors for minimizing heat transfer therebetween. The insulation 4' is of a premium type and the thin layer thereof between the inner and outer doors affords substantially the same insulating effect as the thicker layers of common insulation 4 between the cabinet walls. Also closing the access opening 10 is an auxiliary member or door 15 which hangs on hinges 16, one of which is shown in Fig. 3, secured to the liner 3. As seen in Figs. 1 and 3, the auxiliary door 15 also comprises spaced inner and outer doors between which is provided suitable insulation 15'.

Provided between the main door 11 and the auxiliary door 15 is a fresh food compartment 16'. The fresh food compartment 16' is formed by an enlarged recess 17 formed in the inner door 14 of the main door 11 and a complementary recess 18 formed in the outer side of the auxiliary door 15. A gasket 17' mounted on a face portion 18' formed off the liner 3 around the access opening 10 effectively seals the fresh food compartment 16' from the freezer compartment 5 when the auxiliary door 15 is closed and engaged with the gasket 17', in the manner shown in Figs. 1 and 3. Food shelves 19 which are basket-like in construction are secured to the auxiliary door 15 and project into the recess 17 in the main door 11 when the main door is closed. The basket-like construction of the shelves 19 permits circulation of air through the bottoms thereof and the sides retain food items on the shelves during swinging movement of the auxiliary door. It will be seen that the auxiliary member or door 15 need not include the recess 18 and may or may not be constructed so as to close the access opening 10. It could be a flat door which closes the access opening 10 and covers an enlarged recess in the main door in which would be mounted the shelves 19. Also, it could be a flat or recessed member which does not close the access opening 10 but which is hingedly mounted on the inner door 14 of the main door 11 to cooperate with a recess therein for forming a fresh food compartment.

Provided for cooling the fresh food compartment 16' and effecting different temperatures at the various levels of the shelves 19 is a closed secondary refrigerating system 20, employing a refrigerant of the volatile liquid type. As best seen in Figs. 1 and 2, the secondary refrigerating system 20 includes a condenser portion 21 and an evaporator portion 22, the evaporator portion 22 being partially filled with a vaporizable liquid refrigerant. A valve 23 is provided between the condenser portion and the evaporator portion for controlling the flow of refrigerant in the secondary system. A conduit 24 conducts liquid refrigerant from the condenser portion 21 to the valve. Another conduit 25 conducts vaporous refrigerant from the valve 23 to the condenser portion. Liquid refrigerant is conducted from the valve 23 to the evaporator portion 22 by a conduit 26 and vaporous refrigerant is returned to the valve 23 from the evaporator portion through another conduit 27. The secondary system 20, including the valve 23, is not my invention and is fully disclosed in Patent 2,503,922 issued on the invention of Frank A. Schumacher on April 11, 1950, and assigned to the same assignee as the present invention. The valve 23 differs slightly from that disclosed in the Schumacher patent in that it includes a knob 28 whereby the temperature effected by the secondary system 20 may be manually and adjustably controlled by the user. The valve 23 includes a diaphragm and biasing means, neither of which is shown. The knob 28 cooperates with the biasing means in a manner well known in the art for thereby determining the effects of the biasing means on the diaphragm and in turn determine the operation of the valve 23 in the secondary system 20.

The condenser portion 21 of the secondary refrigerating system 20 is mounted on the inner side or the freezer compartment side of the auxiliary door 15 just behind the uppermost shelf 19 and is in heat exchange relationship with the air in the freezing compartment 5. The evaporator portion 22 is mounted on the lower portion of the outer side of the auxiliary door 15 or in the fresh food compartment 16' adjacent the lower shelves 19 therein for being in heat exchange relationship with the air in the lower portion of the fresh food compartment. The valve 23 is also mounted on the outer side of the auxiliary door 15 in order to permit manipulation of the control knob 28 thereon by the user when the main door 11 is open.

In operation liquid refrigerant in the evaporator portion is vaporized by heat absorbed from the air in the lower portion of the fresh food compartment 16' or, in other words, the food items stored on the shelves 19 adjacent the evaporator portion. The vaporous refrigerant passes through the conduit 27 to the valve 23. From the valve 23 the vaporous refrigerant is conducted to the condenser portion 21 by the conduit 25. As a result of the low temperature maintained in the freezing compartment 5 by the primary evaporator 7, heat is transferred from the vaporous refrigerant in the condensing portion 21 of the secondary system 20 to the colder air in the freezing compartment and the refrigerant in the condensing portion is thereby condensed. The condensed refrigerant flows to the valve 23 through the conduit 24.

In amounts determined by the control setting of the knob 28, the liquid refrigerant flows from the valve 23 through the conduit 26 to the evaporator portion 22 for absorbing more heat from the fresh food compartment 16' and repeating the just-described heat transfer cycle. In this arrangement the temperature in the lower portion of the fresh food compartment 16' or at the shelves adjacent the evaporator 22 may be maintained satisfactory for storing foods which are soon to be consumed or which would be adversely affected if stored in the colder freezing compartment 5. The upper portion of the fresh food compartment is not cooled by the evaporator portion 22 but instead is cooled by heat leakage through the auxiliary door to the freezer compartment, the heat leakage and therefore the cooling of the upper portion of the fresh food compartment being determined by the amount and effectiveness of the insulation used in the auxiliary door. Therefore, the temperature in the upper portion of the fresh food compartment or at the uppermost one of the shelves is maintained somewhat higher than that in the lower portion. For example, if the control knob 28 is set for maintaining the lower portion of the fresh food compartment at 36° to 40°, the upper portion of the fresh food compartment will run around 50°. As a result the uppermost of the shelves 19 will be ideally suited for storing such food items as butter, which it is desired to maintain at an easily spreadable consistency, eggs and certain fruits.

If the user obtains a supply of frozen foods surpassing the capacity of the freezing compartment 5 the fresh food compartment 16' may be utilized for storing frozen foods. This is accomplished by turning the control knob 28 to its lowest setting which causes the secondary system 20 to tend to lower the temperature in the fresh food compartment to the temperature prevailing in the freezing compartment and decreases the heat leakage from the fresh food compartment to the freezing compartment through the door. Thereafter, of course, by turning the knob 28 to a higher setting the user can reconvert the compartment 16' back to a fresh food storage compartment. Thus, the compartment 16' provided between the main door 11 and the auxiliary door 15 may serve either as a fresh food compartment or a freezing compartment and the change over from one to the other and back again may be easily effected by the user.

While I have shown and described a specific embodiment of my invention, I do not desire my invention to be limited to the particular construction shown and described and I intend by the appended claims to cover all modifications within the spirit and scope of my invention.

What I claim as new and desire to secure by Letters Patent of the United States is:

1. A refrigerating apparatus comprising a cabinet, an access opening to said cabinet, a door closing said access opening, an insulating member dividing said cabinet into a fresh food compartment and a freezing compartment, said member and said door cooperating to form said fresh food compartment therebetween, means for cooling said freezing compartment, and a secondary refrigerating system including a condenser portion and an evaporator portion, said condenser portion being mounted on the upper portion of said member and disposed in said freezing compartment and primarily cooled by the ambient air in said freezing compartment, said evaporator portion being mounted on the major and lower portion of said member and disposed in said fresh food compartment in heat exchange relationship with the air in said fresh food compartment, said evaporator portion cooling only the lower portion of said fresh food compartment, the upper portion of said fresh food compartment being cooled by heat leakage through said member to said freezing compartment and operating at a temperature higher than that in said lower portion of said fresh food compartment.

2. A refrigerating apparatus comprising a cabinet, an access opening to said cabinet, a door closing said access opening, an insulating member dividing said cabinet into a fresh food compartment and a freezing compartment, said member and said door cooperating to form said fresh food compartment therebetween, means for cooling said freezing compartment, and a secondary refrigerating system including a condenser portion, an evaporator portion, and a control valve between said condenser and evaporator portions, said condenser portion being mounted on the upper portion of said member and disposed in said freezing compartment and primarily cooled by the ambient air in said freezing compartment, said evaporator portion being mounted on the major and lower portion of said member and disposed in said fresh food compartment in heat exchange relationship with the air in said fresh food compartment, said control valve being adjustable for setting the temperature of said evaporator portion, said evaporator portion cooling only the lower portion of said fresh food compartment, the upper portion of said fresh food compartment being cooled by heat leakage through said member to said freezing compartment and operating at a temperature a predetermined amount higher than that set for said evaporator portion.

3. A refrigerating apparatus comprising a cabinet, an access opening to said cabinet, a main door closing said access opening, an insulated auxiliary door dividing said cabinet into a fresh food compartment between said main and auxiliary doors and a freezing compartment in the remainder of said cabinet, means for cooling said freezing compartment, and a secondary refrigerating system including a condenser portion and an evaporator portion, said condenser portion being mounted on the upper portion of said auxiliary door and disposed in said freezing compartment and primarily cooled by the ambient air in said freezing compartment, said evaporator portion being mounted on the major and lower portion of said auxiliary door and disposed in said fresh food compartment in heat exchange relationship with the air in said fresh food compartment, said evaporator portion cooling only the lower portion of said fresh food compartment, the upper portion of said fresh food compartment being cooled by heat leakage through said auxiliary door to said freezing compartment and operating at a temperature higher than that in said lower portion of said fresh food compartment.

4. A refrigerating apparatus comprising a cabinet, an access opening to said cabinet, a main door closing said access opening, an insulated auxiliary door dividing said cabinet into a fresh food compartment formed between said main and auxiliary doors and a freezing compartment in the remainder of said cabinet, means for cooling said freezing compartment, and a secondary refrigerating system including a condenser portion, an evaporator portion and a control valve between said condenser and evaporator portions, said condenser portion being mounted on the upper portion of said auxiliary door and disposed in said freezing compartment and primarily cooled by the ambient air in said freezing compartment, said evaporator portion being mounted on the major and lower portion of said auxiliary door and disposed in said fresh food compartment in heat exchange relationship with the air in said fresh food compartment, said control valve being adjustable for setting the temperature of said evaporator portion, said evaporator portion cooling only the lower portion of said fresh food compartment, the upper portion of said fresh food compartment being cooled by heat leakage through said auxiliary door to said freezing compartment and operating at a temperature a predetermined amount higher than that set for the said evaporator portion.

5. A refrigerating apparatus comprising a cabinet, an access opening to said cabinet, a main door closing said access opening, an insulated auxiliary door dividing said cabinet into a fresh food compartment and a freezing compartment, said main door including an inwardly opening recess, said auxiliary door including an outwardly opening recess, said recesses in said main and auxiliary doors cooperating to form said fresh food compartment, means for cooling said freezing compartment, and a secondary refrigerating system including a condenser portion and an evaporator portion, said condenser portion being mounted on the upper portion of the inner side of said auxiliary door and disposed in said freezing compartment and primarily cooled by the ambient air in said freezing compartment, said evaporator portion being mounted on the major and lower portion of the outer side of said auxiliary door and disposed in said fresh food compartment in heat exchange relationship with the air in said fresh food compartment, said evaporator portion cooling only the lower portion of said fresh food compartment, the upper portion of said fresh food compartment being cooled by heat leakage through said auxiliary door to said freezing compartment and operating at a temperature higher than that in said lower portion of said fresh food compartment.

6. A refrigerating apparatus comprising a cabinet, an access opening to said cabinet, a main door closing said access opening, an insulated auxiliary door dividing said cabinet into a fresh food compartment and a freezing compartment, said main door including an inwardly opening recess, said auxiliary door including an outwardly opening recess, said recesses in said main and auxiliary doors cooperating to form said fresh food compartment, means for cooling said freezing compartment, and a secondary refrigerating system including a condenser portion, an evaporator portion and a control valve between said condenser and evaporator portions, said condenser portion being mounted on the upper portion of the inner side of said auxiliary door and disposed in said freezing compartment and primarily cooled by the ambient air in said freezing compartment, said evaporator portion being mounted on the major and lower portion of the outer side of said auxiliary door and disposed in said fresh food compartment in heat exchange relationship with the air in said fresh food compartment, said control valve being adjustable for setting the temperature of said evaporator portion, said evaporator portion cooling only the lower portion of said fresh food compartment, the upper portion of said fresh food compartment being cooled by heat leakage through said auxiliary door to said freezing compartment and operating at a temperature a predetermined amount higher than that set for said evaporator portion.

7. A refrigerating apparatus comprising a cabinet, an access opening to said cabinet, a main door closing said access opening, an insulated auxiliary door dividing said cabinet into a fresh food compartment and a freezing compartment, said main door including an inwardly opening recess, said auxiliary door including an outwardly opening recess, said recesses in said main and auxiliary doors cooperating to form said fresh food compartment, means for cooling said freezing compartment, and a secondary refrigerating system including a condenser portion, an evaporator portion and a control valve between said condenser and evaporator portions, said condenser portion being mounted on the upper portion of the inner side of said auxiliary door and disposed in said freezing compartment and primarily cooled by the ambient air in said freezing compartment, said evaporator portion being mounted on the major and lower portion of the outer side of said auxiliary door and disposed in said fresh food compartment in heat exchange relationship with the air in said fresh food compartment, said control valve being located on the outer side of said auxiliary door and being adjustable for setting the temperature of said evaporator portion, said evaporator portion cooling only the lower portion of said fresh food compartment, the upper portion of said fresh food compartment being cooled by heat leakage through said auxiliary door to said freezing compartment and operating at a temperature a predetermined amount higher than that set for said evaporator portion, and a plurality of shelves in said fresh food compartment, at least one of said shelves being located in the upper portion of said fresh food compartment for supporting items requiring less refrigeration than those items stored in said lower portion of said fresh food compartment.

References Cited in the file of this patent

UNITED STATES PATENTS

| | | |
|---|---|---|
| 2,048,892 | Reichert | July 28, 1936 |
| 2,401,460 | Charland | June 4, 1946 |
| 2,503,922 | Schumacher | Apr. 11, 1950 |

OTHER REFERENCES

Refrigeration Systems of General Electric, January 1949.